United States Patent [19]

Rudy et al.

[11] Patent Number: 4,892,652
[45] Date of Patent: Jan. 9, 1990

[54] CURVED DIVERTER PLATE ASSEMBLY FOR INTERCHANGEABILITY OF VARIOUS MODELS OF TRAVELING WATER SCREENS

[75] Inventors: Douglas W. Rudy, Naperville, Ill.; Michael P. Hunnemann, Ottsville; Stephen B. Thomas, Silverdale, both of Pa.

[73] Assignee: FMC Corporation, Chicago, Ill.

[21] Appl. No.: 223,208

[22] Filed: Jul. 22, 1988

[51] Int. Cl.$^4$ .............................................. B01D 33/02
[52] U.S. Cl. ................................... 210/160; 210/236; 210/400; 210/456
[58] Field of Search ............... 210/154, 160, 456, 400, 210/783, 236, 405; 405/80, 83, 87, 88, 99, 117, 118, 119

[56] References Cited

U.S. PATENT DOCUMENTS

| | | | |
|---|---|---|---|
| 1,208,655 | 12/1916 | Reynolds | 210/160 |
| 1,726,608 | 9/1929 | Brackett | 210/161 |
| 2,996,189 | 8/1961 | Salterbach | 210/236 |
| 3,850,804 | 11/1974 | Taylor et al. | 210/155 |
| 4,186,091 | 1/1980 | Sutton | 210/783 |
| 4,305,822 | 12/1981 | Eimer et al. | 210/456 |
| 4,374,736 | 2/1983 | Jackson | 210/783 |

FOREIGN PATENT DOCUMENTS 577255 10/1924 France .
2110809 6/1972 France .

Primary Examiner—W. Gary Jones
Assistant Examiner—Matthew O. Savage
Attorney, Agent, or Firm—Douglas W. Rudy; Richard B. Megley

[57] ABSTRACT

A traveling water screen of the dual flow type is provided with diverter plates having projections on the diverter plates that allow the dual flow water screen to be restrained in position when inserted into compatible channels in a host sluice channel.

3 Claims, 1 Drawing Sheet

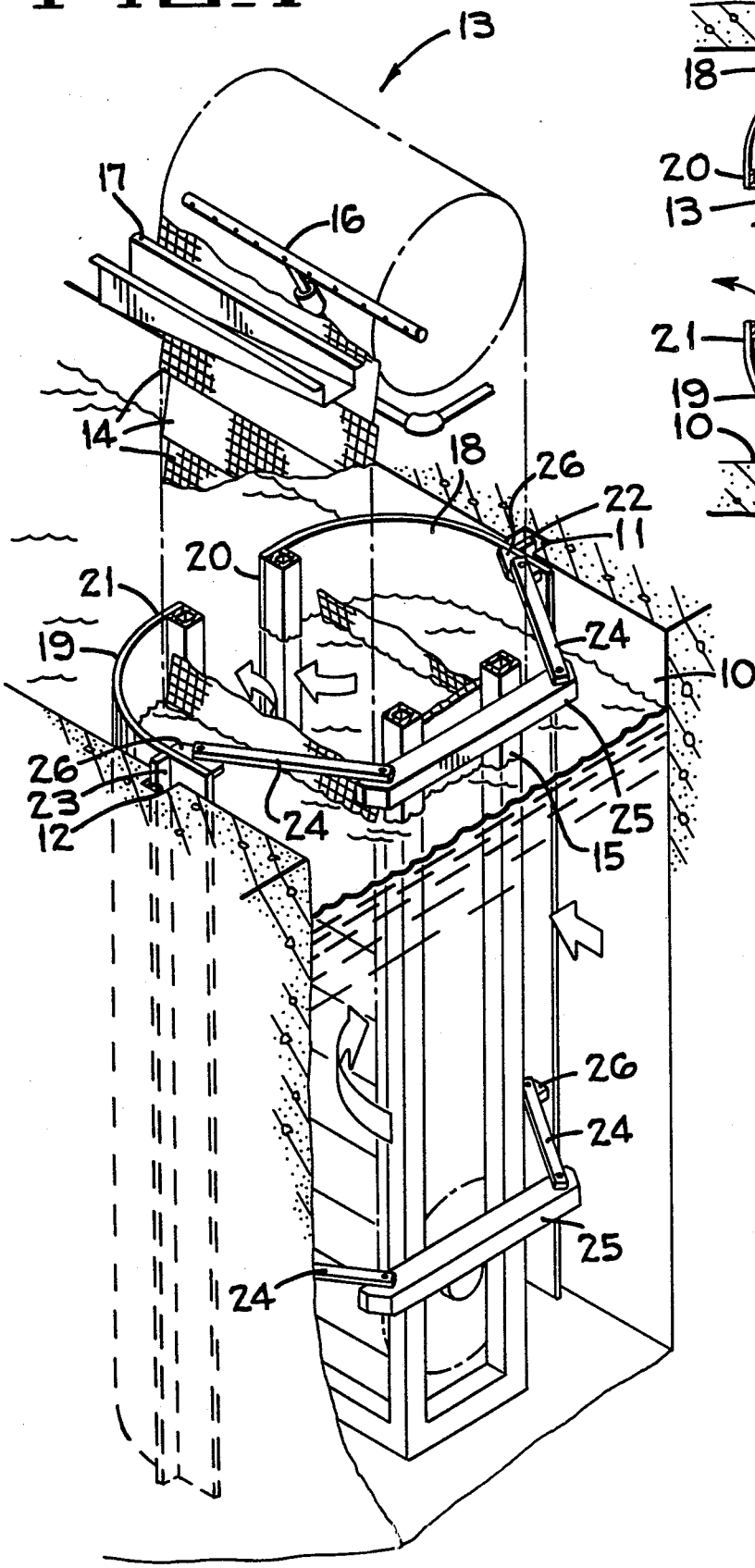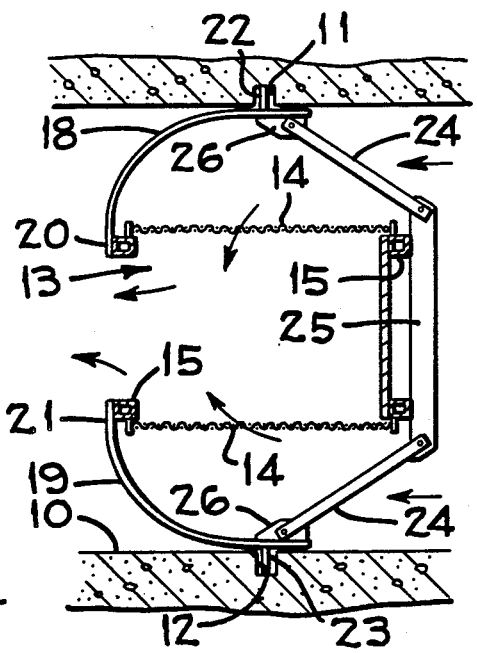

CURVED DIVERTER PLATE ASSEMBLY FOR INTERCHANGEABILITY OF VARIOUS MODELS OF TRAVELING WATER SCREENS

BACKGROUND OF THE INVENTION

1. Field of the Invention

This invention has to do with water treatment equipment, particularly with screens that are designed to remove debris from water delivery channels. The screens may be of the type that travel in a continuous loop around a support structure so that they can be cleaned periodically as screen panel sections are removed from the water. The water treatment screens involved are known as dual flow traveling water screens.

A U.S. Pat. No. (4,374,736) presents a device that is similar to the instant invention in that it shows the use of a dual flow water treatment screen installed in a water delivery channel.

2. Brief Description of the Drawing Figures

The invention herein will be easily understood when considered in light of this specification as illustrated by the drawing figures in which:

FIG. 1 is a projected view of a dual flow water treatment screen with portions broken away and sectioned for clarity.

FIG. 2 is a plan view of a portion of the water screen of FIG. 1.

DETAILED DESCRIPTION OF THE INVENTION

This invention will be easily understood after review of the drawing figures in the context of this specification wherein like figures represent like elements in each of the figures.

In typical water screening operations the water to be screened is channeled through a sluice from an inlet to the outlet or treatment side of the water screen. The sluice is a deep, often concrete or metal channel that has provisions in its vertical walls to accommodate the water treatment screen that is placed in the sluice.

In FIG. 1 the sluice 10 is shown as a concrete structure having a depth about twice the width of the channel. The vertical walls are provided with cavities such as 11 and 12 projecting into the vertical walls typically from the top of the channel to the bottom of the channel walls.

The dual flow water screen, generally 13 is well known in the traveling water screen art and the traveling water screen depicted in the two drawing figures is representative of a dual flow traveling water screen but is not a detailed a presentation. The dual flow traveling water screen 13 is equipped with a continuous series of rectangular screening trays 14. Each end of each screen tray is attached to a strand of heavy duty chain (not shown) which is driven by a motor driving a pair of head sprockets around which the chain is guided. At the lower portion of the traveling water screen frame 15 a pair of foot sprockets guide the chain and attached screening trays around a radius point from the descending to the ascending side of the traveling water screen.

Although a traveling water screen is shown with "foot sprockets" it is equally common, if not more so, to delete the foot sprocket and replace it with a guide channel for the chain and the screens. Only one embodiment of this aspect of the apparatus has been shown, however the improved apparatus would work well with either type of lower end turn around.

The screening trays 14 entrain debris carried in the flow of water through the channel on the intake side of the screen. Direction of flow of water through the screen panels and the channel are shown by the broad arrows in FIG. 1 and the arrows in FIG. 2. Debris trapped by the screens is brought up above the surface of the water level as the drive drives the head sprockets which engage the chain. The debris is washed off the screens by a water jet 16 and into a sluice 17 for discharge in a debris collecting area. Such operation of a dual flow traveling water screen is conventional.

The invention presented herein is directed to the means for positioning and retaining a dual flow traveling water screen 13 in a channel 10 which has been provided with vertical cavities such as 11 and 12 in the walls of the channel. The vertical cavities 11 and 12 may be of a nominal depth and width. The dimensions are not critical as long as they are compatible with the support structure for the dual flow traveling water screen.

The support structure for the dual flow traveling water screen includes first and second curved diverter plates 18 and 19. These curved diverter plates direct the flow of water smoothly from the normal flow of water through the sluice into the traveling water screen without any eddy currents or "dead zones" at the turning point. The curved diverter plates consist of metal or non-metallic material of varying thicknesses depending on structural requirements. The curved diverter plates are attached to the dual flow traveling water screen frame 15 at inboard termination sections 20 and 21 of the curved diverter plates by means of mechanical fasteners or by means of welding or bonding the curved diverter plates to the screen frame 15. From this inboard attachment point 20 and 21 the curved diverter plates curve radially or spirally, depending on channel width, until each of the curved diverter plates becomes approximately tangent to the channel wall.

In the area of contact between the curved diverter plates and the channel walls projection means or protruding flanges such as 22 and 23 are provided. These protruding flanges are fastened to the obverse face (that face not facing the screen panels) of the curved diverter plates and will have a thickness, or more properly a depth, no greater than the depth of the cavities 11 and 12 in the channel walls. The curved diverter plates extend continuously from the top of the channel to the bottom of the channel thereby preventing incoming water from circumventing the dual flow traveling water screen screening surface. The projecting flanges are also "full length" from the top of the channel to the bottom of the channel in a preferred embodiment.

A plurality of horizontal stiffeners such as 25 are used to assist in the location maintenance of the screen frame in the channel. Multiple compression struts 24 connect the horizontal stiffeners to projecting tabs such as 26 which are fastened to the surface of the curved diverter plates. The purpose of the compression struts is to maintain a stable structure in that the lateral water pressure resulting from a differential head across the screening surfaces is transferred directly into the wall guides through the compression struts and to retain the projecting flanges within the cavity of the channel wall when significant pressure is applied to the diverter plate.

These compression struts retain the position of the traveling water screen within the sluice channel in addition to restricting deflection of the traveling water screen towards the downstream direction during periods of high horizontal loading as a result of high differential heads.

The compression struts may be adjustable compression struts that are adjustable in length. Such adjustable compression struts (or members) may be adjustable to obtain compression forces after installation of the traveling water screen. There are many possible embodiments such as screw-in turn buckle types, over-center linkage locking types, cam actuated mounting brackets and others that would operate actually well is providing an adjustable compression strut. By using an adjustable compression strut the ease of inserting and removing the curved diverter plate incorporating the traveling water screen could be improved. That is, by shortening the adjustable compression struts, the installation and removal would be accomplished with more clearance between the projecting flanges such as 22 and the channels such as 11. Once the assembly is in place the adjustable compression struts could be adjusted to be longer thus urging the projections into the wall cavities.

It is also important to note that the projecting flanges 22 and 23 as shown in FIG. 2 are fastened to the obverse side of the curved diverter plates some distance downstream from the upstream facing edges of the curved diverter plates. In the preferred embodiment shown in FIGS. 1 and 2 the extra length of the curved diverter plate, upstream of the projecting flanges 22 and 23 stabilize and seal the curved diverter plate to the walls of the sluice rather than just the vertical channels in the sluice walls.

An alternative embodiment to the flange projection location shown in the figures would be to have the flange projections extending into the wall cavities from the extreme upstream edge of the curved diverter plates. In such an embodiment the projecting flanges could be bent over edges of the curved diverter plates such that the upstream edge of the plates terminate in a ninety degree (more or less) bent over projecting flange.

The foregoing description of the invention is presented as a teaching of the invention, however, it is expected that nuances of design such as the shape of the projecting flanges will be obvious to others. The following claims have attempted to broadly cover the invention and such nuances of design are contemplated as being covered by the following claims.

What is claimed is:

1. Mounting means for mounting a dual flow traveling water screen, said screen including a screen frame, in a channel having a pair of vertical walls having vertical cavities, said mounting means comprising a first curved diverter plate having an upstream edge portion, located adjacent one of the vertical walls, said first curved diverter plate attached to and extending radially outward from said screen frame of said dual flow traveling water screen to one vertical wall of said pair of vertical walls of said channel;

a second curved diverter plate having an upstream edge portion locted adjacent the other vertical wall, said second curved diverter plate attached to and extending radially outward from the screen frame to the other of said pair of channel walls;

said first and second diverter plates each having a projecting flange on the obverse sides of said curved diverter plates, said projecting flanges projecting into said vertical cavities of said walls when said traveling water screen is in said channel;

compression struts extending from said upstream edge portions of said curved diverter plates to said screen frame.

2. The invention in accordance with claim 1 wherein said mounting means further comprises protruding tabs carried on the inside faces of the curved diverter plates; and horizontal stiffeners attached to said screen frame wherein said compression struts are supported by said protruding tabs at one end of the compression struts and at the other end of the compression struts by said horizontal stiffeners.

3. The invention in accordance with claim 1 wherein said compression struts are adjustable compression struts.

* * * * *